Oct. 14, 1958
A. E. McPHEETERS
2,856,542
APPARATUS FOR PREVENTING THE ENTRY OF FOREIGN
MATTER IN PHOTOELECTRIC CELL UNIT
Filed Dec. 2, 1954
2 Sheets-Sheet 1
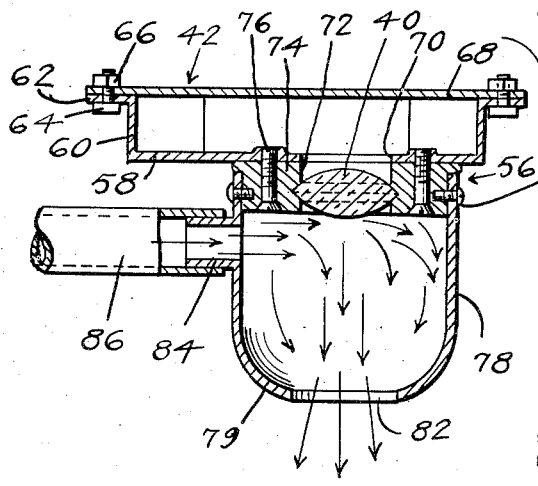
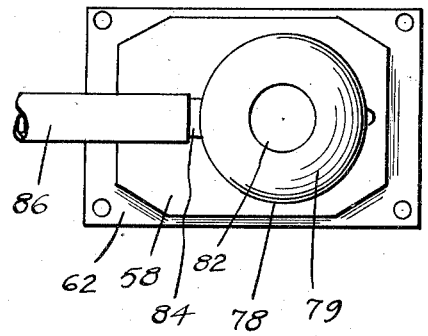
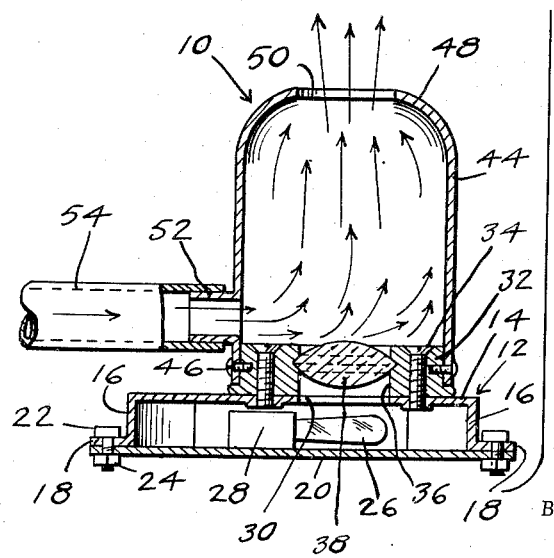
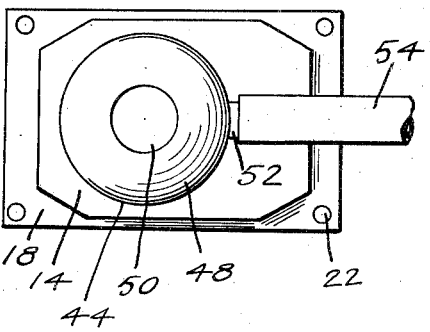
INVENTOR
*A. E. McPheeters*
BY *Kimmel & Crowell*
ATTORNEYS

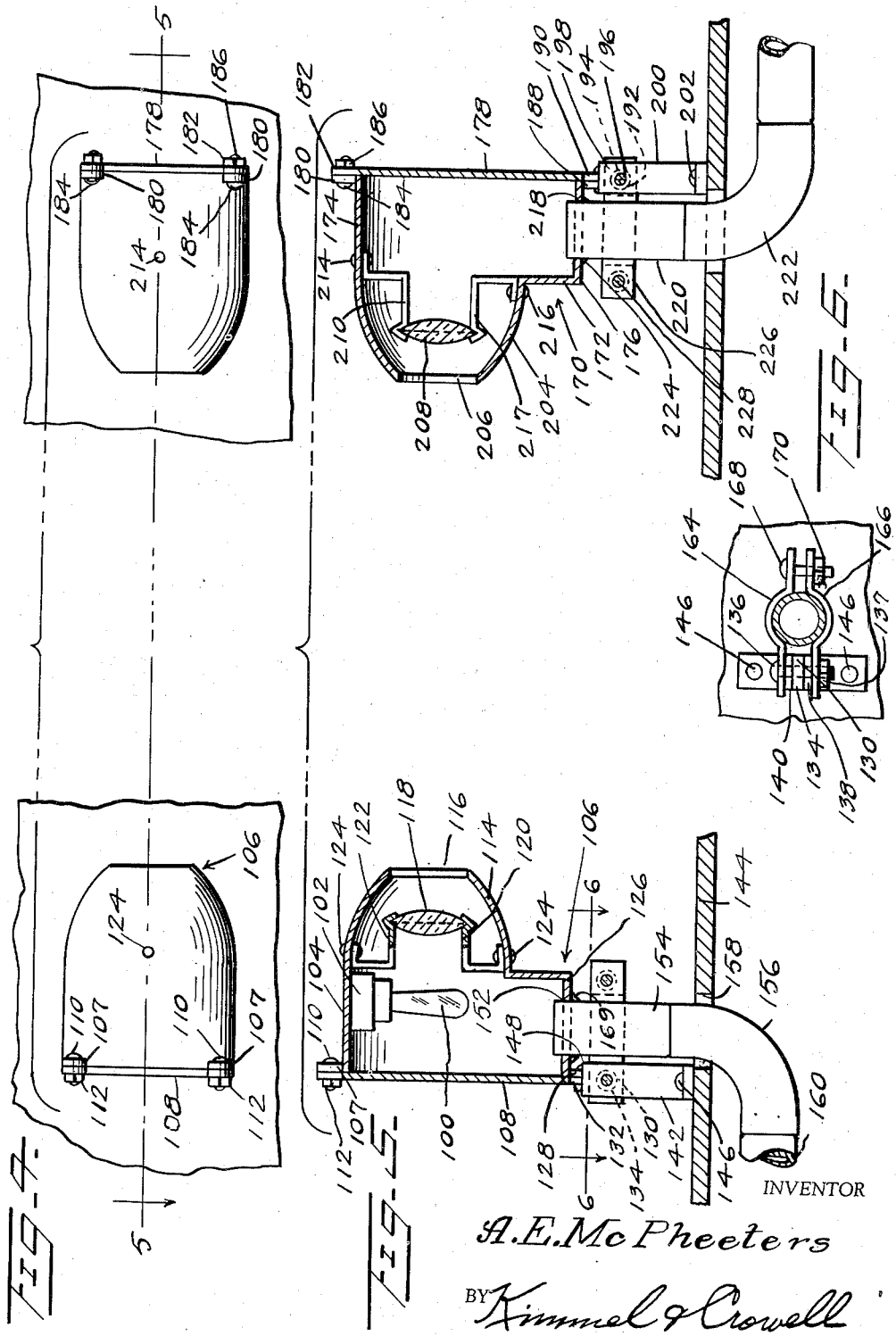

United States Patent Office 2,856,542
Patented Oct. 14, 1958

2,856,542
APPARATUS FOR PREVENTING THE ENTRY OF FOREIGN MATTER IN PHOTOELECTRIC CELL UNIT

August Earnest McPheeters, Eugene, Oreg.

Application December 2, 1954, Serial No. 472,601

1 Claim. (Cl. 250—239)

This invention relates to photoelectric units, including both the light source and the photosensitive cell, and more specifically to means for keeping the lenses of the unit free of dust, dirt and other debris.

In saw mill industries, pulp mills, paper mills, plywood industries, clothing mills and other manufacturing industries, where photoelectric cells are used as measuring and timing devices, the efficiency of the photoelectric unit and its sensitivity depend upon adequate light reaching the cell at all times. In order to maintain the unit at its optimum operating efficiency, it is necessary that the lenses thereof be kept clean. In those industries wherein considerable dust and lint are present, it is not infrequent for the company to hire an employee whose duty is to clean the lenses of the photoelectric cell unit at regular intervals, such as, for example, once every fifteen minutes. Such work is expensive and non-productive.

It is, therefore, one of the primary objects of this invention to provide means for maintaining the photoelectric cell unit lenses dust-free to enable it to operate at maximum efficiency and at a minimum of cost.

A further object of this invention is to provide means for preventing foreign matter from entering a housing for the lens of a photoelectric cell unit.

A still further object of this invention is to provide means of the type described above, the means being readily incorporated in conventional photoelectric cell units.

Another object of this invention is to provide means for directing a stream of air under pressure against one or both sides of the lenses of a photoelectric cell unit, the lenses being mounted in housings whereby dust, lint, dirt and other debris are prevented from entering therein.

This invention also contemplates the provision of such means for keeping clean the lenses of photoelectric cell units, the means being non-complex in construction and operation, inexpensive to manufacture, and non-complex in assembly.

This invention is further directed to the provision of means for keeping free of dust, lint and other foreign matter the light source and photosensitive cell of a photoelectric cell unit wherein no lenses are required.

In its broadest aspect, this invention is directed to means for preventing the accumulation of foreign matter on the obverse, reverse or both sides of a lens enclosed in a housing and exposed to the ambient atmosphere.

Other and further objects and advantages of this invention will become more apparent from a consideration of the following specification when read in conjunction with the annexed drawing, in which:

Figure 1 is an enlarged, exploded cross-sectional view of a photoelectric cell unit, the figure illustrating the relative positions of both the photosensitive cell and the source of light.

Figure 2 is an end elevational view of the photosensitive cell shown in Figure 1.

Figure 3 is an end elevational view of the light source shown in Figure 1.

Figure 4 is an exploded top plan view of a modified form of a photoelectric cell unit, including the photosensitive cell and the light source.

Figure 5 is an exploded cross-sectional view of the photoelectric unit shown in Figure 4, the view being taken on the horizontal plane of line 5—5 of Figure 4, looking in the direction of the arrows.

Figure 6 is a detail view, partly in section, taken on the horizontal plane of line 6—6 of Figure 5.

Referring now more specifically to the drawings, reference numeral 10 designates, in general, a source of light for the photoelectric cell unit. The source 10 comprises a casing 12 having an octagonal configuration which includes a top wall 14 having integrally formed side walls 16 extending laterally therefrom which terminate at their ends in an off-set flange 18 to close one end of the casing. Any conventional means may be used to secure the back plate 20 to the casing 12 such as, for example, the bolts 22 and nuts 24.

An electric light 26 is mounted in a base 28 supported upon the back plate 20, and the light 26 confronts an opening 30 formed in the wall 14.

A substantially annular bushing 32 is secured to the wall 14 by bolts 34 and has its opening 36 co-actually aligned with the opening 30 formed in the wall 14. The bushing 32 supports a lens 38 which is focused upon the lens 40 of the photoelectric sensitive cell designated, in general, by the reference number 42.

An elongated substantially cylindrical casing 44 having a pair of opposed ends is supported on the bushing 32 and one end thereof is detachably secured thereto by means of a plurality of bolts 46. The other end 48 of the casing 44 is ogive in configuration and is provided with an aperture or opening 50 in confronting relation with respect to the lens 38 whereby the light rays emanating therefrom may be transmitted through the opening 50 to the photoelectric sensitive cell 42.

As is seen in Figure 1, the casing 44 is provided with an off-set nipple 52 positioned adjacent the inner end thereof, the nipple 52 being connected with one end of a conduit 54 having its other end connected with a source of air under pressure. The position of the nipple 52 is such that the air discharged from the conduit 54 strikes against the outer surface of the lens 38 and is discharged through the opening 50. The air is maintained at a sufficiently high pressure within the casing 44 so that upon discharge through the opening 50 it is exhausted with sufficient force to resist the entry of foreign matter through the opening and into the housing. The lens 38 is, consequently, maintained free of all extraneous accumulations which would normally interfere with the transmission of light rays therefrom.

The photoelectric sensitive cell 42 is conventional in design and includes a housing 56 having a front wall 58 and integrally formed side walls 60 which terminate in a lateral flange 62. The lateral flange 62 is secured by means of bolts 64 and nuts 66 to a back wall 68.

The front wall 58 is provided with an opening 70 in front of the light sensitive element (not shown), and the opening 70 is aligned with an opening 72 formed in a bushing 74 supporting a lens 40 therein. Bolts 76 serve to detachably secure the bushing 74 to the front wall 58.

A cylindrical casing 78 having a pair of opposed ends has one end thereof releasably secured to the bushing 74 by screws 80. The other end 79 of the casing 78 is ogive in configuration and is provided with an aperture 82 aligned with the lens 40 to permit light rays from the source 10 to pass therethrough and through the lens 40 for impingement upon the light sensitive element.

The casing 78 is formed with a laterally extending nipple 84 which is connected with one end of a conduit 86 having its other end connected with a source of air under pressure. The nipple 84 is positioned adjacent the inner end of the casing 78 whereby air under pressure entering therein engages across the lens 40 and fills the casing 78. The air under pressure is discharged from the aperture 82 with sufficient force to preclude the entry therethrough of all foreign matter.

From the foregoing description of one embodiment of this invention, it will be now understood that means have been provided for maintaining the lenses of the photoelectric unit free and clear of all foreign matter and that the described apparatus requires no maintenance inasmuch as the only condition for its operation resides in the provision of a constant supply of air under pressure.

In the embodiment of this invention illustrated in Figures 4 and 5, the photoelectric sensitive cell unit is again conventional in construction. As illustrated therein, the light source comprises an electric light 100 mounted in a suitable base 102 which is secured to a side wall 104 of a housing 106 having a plurality of laterally projecting lugs 107 which are connected to corresponding lugs 109 integral with a back plate 108. The connections are made by a plurality of screws 110 and nuts 112. The casing 106 is provided with a projecting forward end 114 having an ogive configuration and terminates at its tip with an opening 116 to permit light rays to emanate therefrom from the electric light 100.

As is seen in Figure 5, the light rays are transmitted from the light 100 through a lens 118 supported forwardly thereof on a pair of brackets 120, 122. The brackets are, in turn, mounted upon the casing 106 by means of screws 124, or other means well known in the art; and the brackets are of such size as to permit air to pass freely therearound and around the obverse and reverse sides of the lens 118.

Wall 126 confronts the wall or side 104 and is integrally formed with a lateral lug 128 which terminates in a semi-circular bushing 130. The back wall 108 is provided with an integrally formed laterally extending lug 132 which also terminates in a semi-circular bushing 134. The lugs and semi-circular end portions thereof are juxtaposed with the bushings engaging opposite sides of a bolt 136 supported between the bifurcated arms 138, 140 of a standard 142. The standard 142 is fixed to a support 144 as by the screws 146. The lugs 128, 132 are held in fixed position by the bolt 148 and nut 150.

The wall 126 is provided with an opening 152 which receives one end of a pipe or hose 154. The other end of the pipe or hose 154 connects with one end of an elbow connector 156 which projects through an opening 158 in the support 144 and has its other end connected to one end of a conduit 160. The other end of the conduit 160 is connected with a source of air under pressure.

A pair of spring clamping members 164, 166 engage about the pipe 154 and have one of their respective adjacent ends connected by the screw 168 and nut 170. The other ends of the members 164, 166 are mounted on the bolt 136 and the same, together with the bushings 130, 134 are tightly clamped on the standard 142 between the bolt 136 and nut 137.

To insure a dust-free connection between the pipe 154 and the opening 152 in the wall 126, the pipe 154 may be provided with a sealing ring 169. As before, the air under pressure in the casing 106 is discharged with sufficient force through the opening 116 to preclude the entry of foreign matter through the opening and into the casing.

A light sensitive element (not shown) is disposed within a casing 171 having a front wall 172, opposed side walls 174, 176, and a back wall 178. Lugs 180 and 182, integrally formed with the end wall 176 and with the back wall 178, receive bolts and nuts 184, 186, respectively, to detachably secure the back wall 178 with the casing 171.

The end wall 176 and the back wall 178 are provided with integrally formed lugs 188, 190 which terminate in semi-circular bushings 192, 194 which engage about a bolt 196. The latter is supported between the bifurcated arms 198 of a standard 200, the standard 200 being, in turn, connected with the support 144 by screws 202.

The front wall 172 is formed with an integral, laterally extending projection 204 having an ogive configuration. The outermost end of the projection 204 is constructed with an opening 206 aligned with a lens 208 supported by open brackets 210, 212 mounted within the casing 171 by screws 214, 216.

The wall 176 is provided with an opening 218 to receive one end of a pipe or hose 220 having its other end connected with one end of an elbow connector 222 which extends through the support 144. The other end of the elbow 222 is connected with a source of air under pressure. The open brackets insure that air under pressure may circulate freely therearound and around the obverse and reverse sides of the lens 208.

If desired, a dust seal 224 may be mounted on the pipe 220 and engage around the opening 218.

A pair of resilient clamping members 226 have one of their respective ends secured together by bolt 228 and the other ends thereof are mounted on bolt 196 in such a manner that they, together with the bushings 192, 194 may be fixedly clamped on the standard 200.

In the operation of this unit, air under pressure enters the casing 171 and is freely circulated therein both behind and in front of the lens 208. The lens 208 is maintained free of dust and other debris since the air discharging from the opening 206 does so with such force as to effectively prevent foreign matter from passing therethrough.

In all of the above embodiments of this invention, the openings 50, 82, 116 and 208 are all equal to or greater than the diameters of the lenses associated therewith.

While the two described and illustrated embodiments of this invention include references to a lens system, it will be understood that the present invention is adaptable for keeping and preventing dust, lint and other foreign matter from accumulating on the light source or photosensitive cell in such photoelectric cell units which do not require the use of such lenses.

It will also be appreciated that this invention may be practised with cameras and projectors.

Having described and illustrated two embodiments of this invention, it will be understood that the same are offered merely by way of example, and that the invention is to be limited only by the scope of the following claim.

What is claimed is:

A housing for one unit of a dual unit photoelectric device comprising a compartment having a removable end wall, a tubular member secured to said compartment and extending oppositely of said end wall, said tubular member having the end thereof opposite said end wall open, conduit means secured at one end to said housing and at the opposite end to a source of air under pressure for supplying air to said housing, and an open bracket supporting a lens in said housing in axial alignment with the open end of said tube and in position between the open end of said tube and said conduit to have air from said conduit means flow over both sides of said lens and out the open end of said tubular member.

References Cited in the file of this patent

UNITED STATES PATENTS

| | | |
|---|---|---|
| 1,937,722 | Simon et al. | Dec. 5, 1933 |
| 1,978,589 | McFarlane | Oct. 30, 1934 |
| 2,074,641 | Clark | Mar. 23, 1937 |
| 2,207,097 | Logan | July 9, 1940 |
| 2,361,235 | Pick | Oct. 24, 1944 |

OTHER REFERENCES

R. C. Walker: "Photoelectric Cells in Industry," a book published by Pitman Publishing Corporation, New York and Chicago, 1948. Pages 264 to 267 inclusive, showing Figs. 8.7, 8.8A, 8.8B. A copy of this book is available in Div. 54.